United States Patent [19]

Lee et al.

[11] Patent Number: 4,544,681

[45] Date of Patent: Oct. 1, 1985

[54] FOAMABLE ORGANOSILOXANE COMPOSITIONS

[75] Inventors: Chi-Long Lee; James A. Rabe, both of Midland, Mich.

[73] Assignee: Dow Corning Corporation, Midland, Mich.

[21] Appl. No.: 708,188

[22] Filed: Mar. 4, 1985

Related U.S. Application Data

[62] Division of Ser. No. 665,272, Oct. 26, 1984, Pat. No. 4,518,716.

[51] Int. Cl.$^4$ ............................................... C08J 9/02
[52] U.S. Cl. .................................... 521/134; 521/77; 521/154; 525/100; 525/106; 525/477; 528/42
[58] Field of Search .................... 521/134, 78, 154; 525/100, 106, 477; 528/42

[56] References Cited

U.S. PATENT DOCUMENTS

| | | | |
|---|---|---|---|
| 4,026,845 | 5/1977 | Kim et al. | 521/114 |
| 4,229,548 | 10/1980 | Sattlegger et al. | 521/110 |
| 4,418,157 | 11/1983 | Modic | 521/154 |

*Primary Examiner*—Morton Foelak
*Attorney, Agent, or Firm*—Robert Spector

[57] ABSTRACT

Polyorganosiloxane foams exhibiting a desirable combination of low density, an average cell size between 0.2 and 4 mm and a cell concentration of at least 4 per linear centimeter are obtained by dispensing and curing moisture curable organosiloxane compositions containing a dispersed liquid or gaseous blowing agent and, as a foam stabilizer, a resinous organosiloxane copolymer comprising trimethylsiloxy units, $SiO_{4/2}$ units and fluorine-containing organosiloxane units. The polymer portion of the organosiloxane compositions can be a polydimethylsiloxane or a graft copolymer comprising at least 20 mole percent of dimethylsiloxane units in combination with organic units.

8 Claims, No Drawings

FOAMABLE ORGANOSILOXANE COMPOSITIONS

This application is a division of application Ser. No. 665,272, filed Oct. 26, 1984, now U.S. Pat. No. 4,518,716.

FIELD OF THE INVENTION

This invention relates to the preparation of cured polyorganosiloxane foams. More particularly, this invention relates to foamable polyorganosiloxane compositions which are stable when stored in pressurized containers that exclude atmospheric moisture. Useful foams exhibiting uniformly small cells are obtained when these compositions are dispensed and cured in the presence of atmospheric moisture.

BACKGROUND INFORMATION

One of the known methods for preparing polyorganosiloxane foams involves the reaction of polyorganosiloxanes containing silicon-bonded hydroxyl groups with organosilicon materials containing silicon-bonded hydrogen atoms in the presence of a suitable catalyst. Reactants containing silicon-bonded vinyl radicals can be included in the composition to enhance the properties of the final cured foam. Foams of this type are disclosed in U.S. Pat. No. 3,024,210 to Weyer, which issued on Mar. 6, 1962, U.S. Pat. No. 3,070,555 to Bruner, which issued on Dec. 25, 1963, U.S. Pat. No. 3,338,847 to Nitzche et al., which issued on Aug. 29, 1967 and U.S. Pat. No. 3,923,705 to Smith, which issued on Dec. 2, 1975.

In the absence of an inhibitor, compositions containing hydroxyl groups and silicon-bonded hydrogen atoms begin to react at ambient temperature almost as soon as the reactants containing these groups are combined. Inhibitors such as acetylenic alcohols will at least partially suppress the reactivity of the composition at 25° C., and the composition must be heated to temperatures of 75° C. or higher to produce a foam. Such compositions cannot be used as storage stable one-part formulations for preparing cured foams at room temperature.

The preparation of foams by the action of a blowing agent within moisture curable room temperature vulcanizable (RTV) polyorganosiloxane compositions is known. These compositions typically contain a liquid hydroxyl endblocked polydiorganosiloxane and a liquid or solubilized crosslinker containing 3 or more silicon-bonded groups which undergo hydrolysis readily at room temperature and in the presence of atmospheric moisture.

The relatively slow curing rate that characterizes RTV compositions is particularly disadvantageous for the preparation of foams. At the relatively low viscosity desired to facilitate blending and transfer of the foamable composition, the partially cured foams tend to collapse when the introduction or evolution of blowing agent ceases, and at least a portion of the uncured liquid reactants in the cell walls drains from the foam. In addition to causing a collapse of the foam, the liquid which drains cures to a solid rubber.

In U.S. Pat. No. 4,368,279, which issued on Jan. 11, 1983, F. T. Modic and B. E. Boudreau teach that the collapse of foams obtained by beating air or other gaseous blowing agent into RTV polyorganosiloxane compositions can be avoided by placing the uncured foam under a vacuum equivalent to a maximum pressure of 79.8 kPa for at least 5 minutes. The curable compositions disclosed by Modic and Boudreau contain a silanol terminated polydiorganosiloxane base polymer, a crosslinking agent, a curing promoter and, in the case of one-part compositions, a small amount of water.

While the use of vacuum during curing may be practical for machine made foams such as slab stock and molded foams, this technique cannot be used when the foam is formed within a cavity of a building or at other locations where it is not feasible to maintain the foam under vacuum during curing. In addition, the necessity of mixing in a gaseous blowing agent at the time the foam is formed requires that mixing and aerating equipment be transported to the location where the foam is to be installed. For some applications, particularly those requiring relatively small amounts of foam at relatively remote locations, such equipment would not be practical. In these instances it would be considerably more convenient to employ a one-component foamable composition, including a blowing agent, packaged in a container that can be easily transported to the application site and which is capable of repeatedly dispensing the foamable composition without the need for additional processing steps or ingredients.

U.S. Pat. No. 4,229,548, which issued on Oct. 21, 1980 to Sattleger et al. discloses a 2-compartment aerosol type container for storing and dispensing a foamable polyorganosiloxane composition. The container consists of a flexible walled inner compartment containing a foamable RTV composition that includes a hydroxy-endblocked polydiorganosiloxane, a curing agent and, optionally, a gaseous blowing agent and an outer compartment containing a moisture free inert gas under a pressure of from 0.2 to 3.0 megapascals. The container is equipped with a valve through which the foamable composition is dispensed under the presence of the gas confined in the outer compartment of the container. The formation of polyorganosiloxane foams by dispensing a one-part moisture curable RTV polyorganosiloxane composition stored under pressure in a 2-compartment container is also taught in German published application Nos. 2,909,443 (published Sept. 18, 1980) and 2,911,971 (published Oct. 9, 1980).

Foams produced by dispensing silica-filled RTV polyorganosiloxane compositions, including a blowing agent and/or a propellant, from pressurized containers, such as aerosol cans, are characterized by densities from 0.58 to 0.81 g./cc. The need to minimize collapse of the cellular structure in partially cured foams and the resultant increase in density by the use of vacuum, by heating to accelerate curing or by other means requiring additional processing steps may more than offset the advantages achieved by using foamable compositions packaged in portable pressurized containers such as aerosol cans.

The art discloses additives for reducing the density of polyorganosiloxane foams formed by the reaction of silicon-bonded hydroxyl groups with silicon-bonded hydrogen atoms. U.S. Pat. No. 4,026,845, which issued on May 31, 1977 to Y. K. Kim et al., teaches using known fluorine-containing surfactants for this purpose. The surfactants contain fluorine atoms bonded to carbon, and include both organic and organosilicon compounds.

SUMMARY OF THE INVENTION

An objective of this invention is to provide foamable, moisture curable RTV polyorganosiloxane compositions capable of being packaged and stored in pressurized containers in combination with a blowing agent. When dispensed into an area under atmospheric pressure, the compositions form liquid froths that retain a major portion of their initial height during the curing reaction whereby the froths are converted to closed cell foams containing a homogeneous distribution of small cells.

It has now been found that the stability of partially cured foams prepared by dispensing from a pressurized container moisture curable polyorganosiloxane compositions containing a dispersed blowing agent is improved by including in said composition a resinous organosiloxane copolymer comprising trimethylsiloxy units, $SiO_{4/2}$ units and fluorine-containing units. The polymer portion of the organosiloxane compositions can be a polydimethylsiloxane or a copolymer comprising at least 20 mole percent of dimethylsiloxane units in combination with organic units.

DETAILED DESCRIPTION OF THE INVENTION

This invention provides a foamable polyorganosiloxane composition exhibiting a viscosity of from 0.5 to 500 Pa.s at 25° C. in the absence of blowing agents, where said composition is stable during storage under substantially anhydrous conditions and superatmospheric pressure, and in the presence of atmospheric pressure and moisture yields a cured, closed cell polyorganosiloxane foam, exhibiting a cell size range of from 0.1 to 4 mm and a minimum cell concentration of 4 per linear centimeter, said composition comprising the product obtained by mixing in the absence of atmospheric moisture (A) a room temperature vulcanizable elastomeric composition comprising the moisture curable product obtained by mixing (1) an organosiloxane polymer curable in the presence of a moisture reactive crosslinker and selected from the group consisting of polydimethylsiloxanes, block copolymers and graft copolymers where said block copolymers and graft copolymers contain at least 20 mole percent of dimethylsiloxane units, any remaining units being derived from substantially linear addition or condensation type organic polymers, and (2) an amount of a crosslinker sufficient to cure (1) in the presence of atmospheric moisture, (B) a foam stabilizer in an amount sufficient to stabilize said foam during the curing process, where (B) consists essentially of a resinous, benzene-soluble organosiloxane copolymer consisting essentially of $SiO_{4/2}$ units, silicon-bonded hydroxyl groups, $(CH_3)_3SiO_{1/2}$ units and fluorine-containing units selected from the group consisting of $R_aR'_bSiO_{(4-a-b)/2}$, $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is in turn bonded to a sequence of at least two methylene units, R' is an alkyl radical containing from 1 to 3 carbon atoms, R'' is a divalent organic radical containing at least four perfluorinated carbon atoms and is bonded to the silicon atom of said fluorine-containing units, a is 1 or 2, b is 0, 1 or 2, and the sum of a and b is 3 or less with the proviso that when R and R'' represent fluorine-containing units bonded to silicon via an oxygen atom that is, in turn, bonded to a sequence of at least two methylene groups, the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (B) in a hydroxyl endblocked polydimethylsiloxane exhibiting a viscosity of 0.08 Pa.s at 25° C. and (b) require the addition of from 0 to 100 percent by weight of xylene to said 10 percent by weight solution, to achieve optical clarity; (C) a blowing agent in an amount sufficient to convert said polyorganosiloxane composition to a foam under atmospheric pressure and at a temperature of 25° C.

The characterizing feature of the present foamable polyorganosiloxane compositions that distinguishes them from prior art foamable polyorganosiloxane compositions is the novel foam stabilizer, referred to hereinafter as (B). When the present stabilizers are combined with a room temperature vulcanizable (RTV) elastomeric composition, referred to hereinafter as (A), a blowing agent, referred to hereinafter as (C), and any optional ingredients such as fillers the resultant composition can be packaged in a pressurizable container such as an aerosol can and subsequently dispensed to yield useful moisture cured foams, providing that the viscosity of the composition is from 0.1 to 500 Pa.s in the absence of the blowing agent.

RTV elastomeric compositions (A) are a known class of materials, and are typically prepared by combining a polydiorganosiloxane and a moisture reactive crosslinker for the polydiorganosiloxane together with optional ingredients such as fillers, adhesion promoters, pigments and flame retarding agents, under conditions that avoid damaging contact with atmospheric moisture.

Dimethylsiloxane polymers suitable for use in (A) include dimethylsiloxane homopolymers and graft copolymers containing at least 20 mole percent dimethylsiloxane units. The polymers also contain a hydroxyl group or at least two hydrolyzable groups such as alkoxy at each of the terminal positions of the polymer molecules. Moisture curable RTV elastomeric compositions containing a polydimethylsiloxane in combination with a crosslinker and optionally other additives including fillers and curing catalysts are sufficiently described in the prior art that a detailed description of these materials is not required in this specification.

For the purposes of this invention, it should suffice to say that hydroxyl endblocked polydimethylsiloxanes suitable for use in (A) can be prepared by the base catalyzed hydrolysis and polymerization of cyclic dimethylsiloxanes under controlled conditions to yield polymers of the desired molecular weight.

Graft type organic copolymers are discussed at length in a number of texts on the subject of polymer chemistry, including *Macromolecules* by Hans George Elias (Plenum Publishing Corporation, New York, N.Y., 1977) and the *Encyclopedia of Polymer Science and Technology* (Wiley-Interscience, New York, 1964).

Several types of silicone-organic copolymers are disclosed in *Chemistry and Technology of Silicones* by Walter Noll (Academic Press, New York, 1968).

Polydimethylsiloxane graft copolymers can be prepared by the peroxide catalyzed polymerization of ethylenically unsaturated organic compounds in the presence of hydroxyl endblocked polydimethylsiloxanes. A preferred class of graft copolymers is described in U.S. Pat. No. 3,555,109, which issued to J. C. Getson on Jan. 12, 1971. This patent is hereby incorporated herein by reference as a teaching of suitable dimethylsiloxane graft copolymers.

The graft copolymers disclosed by Getson are characterized by the presence of rod-shaped particles measuring from 5 to 500 microns in length. The copolymers are prepared by reacting a substantially linear hydroxyl endblocked polydiorganosiloxane exhibiting a viscosity of up to 6 Pa.s at 25° C. with one or more olefinically unsaturated organic monomers such as styrene, ethylene and esters of acrylic and methacrylic acids. The reactants are combined with an organic peroxide catalyst and the resulting mixture is stirred at a rate sufficient to produce rod-shaped particles of the desired size range. The relationship between particle size and shear rate is discussed in this patent.

A preferred example of a graft copolymer composition is a grafted hydroxyl terminated polydimethylsiloxane available as Silgan ® H-622 from SWS Silicones Corporation. The accompanying examples demonstrate that the presence of this graft copolymer in a foamable composition of this invention substantially decreases the curing time of the composition in addition to increasing the tensile properties of the cured foam.

The graft copolymer can constitute all or a portion of the organosiloxane polymer portion of (A). Because a high concentration of the preferred graft copolymers adversely affects certain desirable properties such as flame retardancy and weatherability exhibited by the cured foam, the concentration of graft copolymer should preferably not exceed about 80 weight percent of the organosiloxane polymer portion of (A).

Ingredient (A) can contain two or more dimethylsiloxane homopolymers, copolymers, or a mixture of said homopolymers and copolymers. In addition to dimethylsiloxane units, the organosiloxane portions of the polymers may contain small amounts, typically less than 0.5% by weight, of monomethylsiloxy, trimethylsiloxy and $SiO_{4/2}$ units. These additional units result from impurities present in the starting material or intermediate used to prepare the polymer. The molar ratio of hydrocarbon radicals to silicon is preferably from 1.98 to 2.01. In addition to dimethylsiloxane units, the polymer may also contain up to a total of about 5% by weight of other silicon-bonded hydrocarbon radicals, including ethyl, propyl, 3,3,3-trifluoropropyl and phenyl. To ensure compatibility with the other ingredients of the present composition, it is preferably that at least 98% of the hydrocarbon radicals are methyl.

Most preferably (A) includes at least one polydimethylsiloxane of the general formula $HO[Si(CH_3)_2O]_mH$ where m has an average value of from about 60 up to about 600.

The polymer portion of (A) preferably exhibits a viscosity of from 0.1 to 100 Pa.s at 25° C. Preferably the range is from 1.0 to 15 Pa.s. Within the most preferred range, optimum combinations of practical dispensing rates for the composition and good stability of the foam during curing are achieved.

The dimethylsiloxane polymer portion of (A) typically constitutes from 10 to 90% by weight of the foamable polyorganosiloxane composition of this invention in the absence of the volatile blowing agent (C). Preferably this value is from 15 to 75%.

The moisture reactive crosslinker portion of (A) can be any polyfunctional organosilicon material that will react with hydroxyl-containing polyorganosiloxanes at room temperature in the presence of atmospheric moisture to form cured compositions. One class of suitable crosslinkers includes silanes of the general formula $R_p{}^1SiX_{4-p}$ where $R^1$ represents a monovalent hydrocarbon radical, X is a hydrolyzable group and the average value of p is less than 2 but greater than zero. X can be acyloxy such as acetoxy, alkoxy such as methoxy, ketoximo of the formula $-ON=CR_2{}^2$ where each $R^2$ is individually alkyl containing from 1 to 4 carbon atoms and is preferably methyl or ethyl; aminoxy of the formula $-ONR_2{}^2$ or amido of the formula $-N(R^3)-C(O)R^2$ where $R^3$ is as hydrogen or alkyl defined hereinabove for $R^2$.

To ensure compatibility between the crosslinker and the organosiloxane polymer portion of (A), $R^1$ preferably represents vinyl or a lower alkyl radical.

In place of, or in addition to the foregoing silanes, the crosslinker can include partial hydrolysis products of these silanes or siloxanes that include at least three repeating units per molecule of the formula $R^1 XSiO$ When the present compositions are dispensed from the pressurized containers in which they are stored, the dispersed blowing agent expands rapidly resulting in the formation of a froth. The crosslinker should react with sufficient rapidity that the composition quickly becomes sufficiently viscous to reduce the drainage of liquid material during the curing process. Drainage of liquid, which can result from causes other than insufficient reactivity of the crosslinker, is undesirable because it is often accompanied by a collapse of the cellular structure of the froth and an accompanying increase in the density of the cured foam. In addition, the liquid which drains cures to form a noncellular rubber.

The prior art teaches the relative reactivities of various crosslinkers for RTV compositions and catalysts that can be employed to increase these reactivities. Selection of an appropriate crosslinker and any required catalysts, can be accomplished with at most a minimum of experimentation by those skilled in the art using available information.

Preferred crosslinkers for use in (A) include silanes and siloxanes where $R^1$ represents methyl or vinyl and X represents $-OC(O)CH_3$, $-ON(C_2H_5)_2$, $-ON=C(CH_3)(C_2H_5)$ or $-OCH_3$.

Particularly effective crosslinkers that react sufficiently rapidly to reduce the drainage of liquid during curing are combinations of a trifunctional ketoximosilane of the general formula $R^1Si[ON=C(CH_3)(C_2H_5)]_3$ with from 10 to 50%, based on the total curing agent weight, of the tetrafunctional silane $Si[ON=C(CH_3)C_2H_5)]_4$.

The extent to which the foam collapses during the curing reaction using the preferred mixture of ketoximosilanes described in the immediately preceding paragraph, can be further reduced to 5% or less by incorporating from 2 to about 10 weight % of fume silica or other finely divided silica into the foamable composition.

To achieve stability during storage, the molar ratio of hydrolyzable groups present in the crosslinker, represented by X in the foregoing formula, to the hydroxyl groups present in the ingredients used to prepare the foamable composition should be greater than 2:1. A molar ratio of at least 3:1 is preferred.

The crosslinkers described hereinbefore are typically used at concentrations of from about 0.1 to about 10 parts by weight per 100 parts by weight of the organosiloxane polymer portion of (A).

As discussed hereinbefore, the reactivity exhibited by many of the known RTV crosslinkers can be considerably increased in the presence of relatively small amounts of catalysts. Useful catalysts include inorganic and organic tin compounds, such as stannous octoate and dibutyltin dilaurate, and titanium compounds. It is known that (1) crosslinkers containing aminoxy groups (ONR$_2^2$), where R$^2$ is defined hereinbefore as the hydrolyzable group typically do not require catalysts, and (2) titanium compounds, particularly chelated titanium compounds, effectively catalyze the reaction between silicon-bonded hydroxyl and silicon-bonded alkoxy groups in the presence of atmospheric moisture.

When alkoxysilanes are used as the crosslinker the compositions of this invention can optionally include any of the known hydroxyl group scavengers that are disclosed, for example, in U.S. Pat. No. 4,395,526, which issued to Chung on Jan. 3, 1984, and is incorporated herein by reference.

The organosiloxane polymer and crosslinker that comprise ingredient (A) can be two distinct species. Alternatively, the organosiloxane polymer can contain substituents that react with one another in the presence of atmospheric moisture to yield a cured polymer. An example of the latter is a polydimethylsiloxane containing terminal isocyanate groups. These polymers can be prepared using known synthetic methods.

The foam stabilizer, referred to hereinabove as ingredient (B), maintains the cellular structure of the initially produced froth until (A) has cured to the extent that the structure becomes self supporting. The examples which form part of this specification demonstrate that foams having average cell sizes below about 4 mm. and cell concentrations greater than about four per linear centimeter are not formed if the stabilizer is omitted from the present compositions or is replaced by materials discussed hereinbefore as effective for reducing the density of foams prepared using formulations containing silicon-bonded hydroxyl groups and silicon-bonded hydrogen atoms.

The foam stabilizers (B) are resinous, benzene-soluble organosiloxane copolymers wherein the repeating units include, but are not limited to, SiO$_{4/2}$ units, (CH$_3$)$_3$SiO$_{\frac{1}{2}}$ units and fluorine-containing units comprising at least four perfluorinated carbon atoms and represented by R and R" in the foregoing formulae. Each of the fluorine-containing units also includes one or two silicon atoms that are joined to the fluorine-containing carbon atoms by a sequence of at least two methylene (—CH$_2$—) units or by an oxygen atom that is, in turn, bonded to said sequence. This sequence forms part of the group represented by R in the foregoing formulae.

The fluorine-containing units of (B) can be identical or different. These units exhibit the general average formula R$_a$R'$_b$SiO$_{(4-a-b)/2}$ or R"[Si(R')$_b$O$_{(3-b)/2}$]$_2$. In these formulae R and R" represent, respectively, monovalent and divalent fluorinated organic radicals as described hereinbefore, R' is alkyl containing from 1 to 3 carbon atoms, a is 1 or 2, b is 0, 1 or 2 and the sum of a and b is 3 or less.

In addition to at least four perfluorinated carbon atoms, R and R" can include partially fluorinated and/or nonfluorinated carbon atoms. The carbon atoms of R and R" can be present in the form of linear chains, branched chains or carboxylic rings. The fluorinated carbon atoms comprising R and R" can be adjacent or separated by nonfluorinated carbon atoms, by atoms such as nitrogen, oxygen or sulfur or by divalent groups such as carbonyl, amido, carboalkoxy, and other groups which do not hydrolyze readily, will not cause premature curing of the present foamable compositions during storage and will not substantially inhibit curing of the compositions in the presence of atmospheric moisture. R and R" can contain from 4 to 20 or more carbon atoms, but preferably contain from 4 to 16 carbon atoms.

The relative concentrations of (CH$_3$)$_3$SiO$_{\frac{1}{2}}$, fluorinated siloxane units and any additional units other than SiO$_{4/2}$ units and hydroxyl groups must be within certain limits for (B) to function effectively. These limits are most conveniently expressed in terms of their effect on the surface tension of a hydroxyl terminated polydimethylsiloxane and on the solubility of (B) in this medium.

Specifically, a 10% by weight solution of (B) in a hydroxyl-terminated polydimethylsiloxane exhibiting a viscosity of 0.08 Pa.s at 25° C. should exhibit a surface tension of less than $2.2 \times 10^{-4}$ newtons per centimeter at 25° C. Furthermore, at this same concentration level and temperature the solution must be either optically clear or become optically clear following the addition of not more than 100%, based on the weight of said solution, of xylene.

While not wishing to be bound by any theory, it appears that effective foam stabilizers decrease the surface tension of a foamable composition and exhibit only limited solubility in the composition. The low degree of solubility ensures that at least a portion of the stabilizer will be present at liquid-gas interfaces of the cellular structure of the froth formed by the action of the blowing agent on (A) thereby reducing the surface tension at the liquid-air interfaces and increasing the stability of the froth during the curing reaction. The relatively high viscosity of the present foam stabilizers is believed to impart additional stability to the froth during curing by increasing the elasticity of the cell walls and also reducing the rate at which liquid drains from the cellular structure.

The molar ratio of units other than silicon-bonded hydroxyl groups in (B) and SiO$_{4/2}$ units to SiO$_{4/2}$ units is from 0.7:1 to 1.1:1, inclusive. To maximize the efficacy of (B) as a foam stabilizer for the preferred foamable compositions disclosed in the accompanying examples, this ratio is preferably from 0.7:1 to 0.9:1, inclusive.

When the foamable composition contains an organotin catalyst and/or generates acidic materials as by-products of the curing reaction, it is usually desirable to employ foam stabilizers wherein the R and R" radicals of the foregoing formulae are bonded to silicon through a sequence of at least two methylene units, resulting in a silicon carbon bond. The reason for this preference is that silicon-oxygen-carbon bonds are apparently more susceptible to cleaving in the presence of acids and/or organotin compounds than silicon carbon bonds. This cleaving appears to destroy or substantially diminish the efficacy of ingredient (B) as a foam stabilizer.

In addition to the silicon-containing units disclosed hereinbefore, (B) typically contains from 0.2 up to about 4% by weight of silicon-bonded hydroxyl groups. (B) can also contain up to about 10 weight % of $GSiO_{3/2}$ units, where G represents the residue obtained by removing the hydrogen atom from a hydroxyl group of a hydroxyl containing linear organic polymer. Useful organic polymers include homopolymers of ethylenically unsaturated alcohols such as allyl and cinnamyl alcohol, copolymers of these alcohols with ethylenically unsaturated hydrocarbons such as styrene, and polyethers or polyoxyalkylene glycols containing an average of at least one terminal hydroxyl group per molecule. Preferred polymers include styrene/allyl alcohol copolymers and polyoxyalkylene glycols such as polyoxyethylene glycol.

While not a required part of (B), the presence of $GSiO_{3/2}$ units is desirable because they permit (B) to function as an effective stabilizer with less fluorine than would be required if the $GSiO_{3/2}$ units were absent. Because in many instances hydroxyl-containing organic polymers corresponding to the formula GH are considerably less expensive than the fluorine-containing intermediates used to prepare (B), it is usually preferable to employ these organic polymers in place of the additional fluorine-containing intermediate needed to decrease the solubility of (B) in (A).

Resinous copolymers wherein fluorine-containing hydrocarbon radicals are bonded to silicon through at least two methylene units can be prepared by reacting trimethylchlorosilane in combination with (1) a fluorine-containing silane of the formula $R_aR'_bSiCl$ where the sum of a and b is 3, (2) a silane of the formula $R''[Si(R)_2Cl]_2$, or (3) suitable derivatives of either (1) or (2) wherein the chlorine atoms are replaced by other hydrolyzable groups. The resultant fluorinated silane is reacted with an aqueous solution of sodium silicate as described by Daudt et al. in U.S. Pat. No. 2,676,182, which issued on Apr. 20, 1954. The disclosure of this patent is incorporated herein in its entirety by reference. The reaction of fluorine-containing silanes with sodium silicate is disclosed in U.S. Pat. No. 3,328,349, which issued on June 27, 1967 to Lentz and is incorporated herein in its entirety by reference. In accordance with a combination of Lentz's and Daudt et al.'s teaching, an aqueous solution of sodium silicate (e.g. No. 9 sodium silicate sold by E. I. Dupont de Nemours and Co.) is acidified to the proper pH by adding it to a mixture of hydrochloric acid and isopropanol. The resulting acidic silica hydrosol can then be treated with a source of $R_aR'_bSiO_{(4-a-b)/2}$ siloxane units, such as $(R)(CH_3)_2SiOCH_3$ or $(R)(CH_3)_2SiCl$, and a source of $(CH_3)_3SiO_{\frac{1}{2}}$ units, such as $(CH_3)_3SiCl$ These reactants are preferably first dissolved in a mixture of isopropanol and xylene. If chlorosilanes are used, acidification of the sodium silicate may not be required.

After being heated for the time interval required to substantially complete the reaction, the resultant mixture is cooled, whereupon it separates into an aqueous phase, which is discarded, and a nonaqueous phase containing the resinous copolymer. The nonaqueous phase is washed with water to reduce its acid number and remove water-soluble components, such as isopropyl alcohol. Preferably the resinous copolymers prepared by this method are washed with water to remove most, but not all of the acid. The products typically have sufficient acid to provide an acid number of from 0.2 to 2.0.

The fluorinated silanes and siloxanes that can be used to prepare (B) are either known or can be synthesized using known methods. The synthesis of preferred silanes is described in the accompanying examples.

If organic solvents are used to prepare the foam stabilizer (B), these are preferably replaced with a trimethylsiloxy endblocked polydimethylsiloxane exhibiting a viscosity of from about 0.001 to about 1 Pa.s at 25° C.

If it is desired to incorporate repeating units of the foregoing $GSiO_{3/2}$ type into the copolymer, this can be accomplished by including the corresponding hydroxyl-containing polymer GH in the reaction mixture together with the fluorinated reactant. Suitable polymers have been discussed hereinbefore.

A second method for preparing foam stabilizers containing either SiO or SiC bonds comprises reacting nonfluorinated resinous copolymers of the type described in the aforementioned Daudt et al. patent with a fluorinated material. Suitable copolymers contain $(CH_3)_3SiO_{\frac{1}{2}}$ and $SiO_{4/2}$ units in addition to from 0.5 to 4.0% by weight of silicon-bonded hydroxyl groups. The copolymers are reacted with at least one fluorine-containing silane of the formula $R_aR'_bSiY_{(4-a-b)}$ or $YSi(R')_2R''(R')_2SiY$, a partial hydrolysis product of either of the foregoing silanes or at least one fluorine-containing alcohol of the formula $F(C_nF_{2n})(CH_2)_2OH$ where R, R', R'', a and b are defined hereinbefore, Y is a halogen, preferably chlorine or other hydrolyzable group and the average value of n is from 4 to 20.

In preferred embodiments of (B), R of the foregoing formula represents $F(C_nF_{2n})(CH_2—_2O_c$, R' is methyl, R'' represents $—O_c—CH_2—_2—C_nF_{2n}—CH_2)_2O_c—$, c is 0 or 1, and the average value of n is at least 4. Most preferably R represents a mixture of homologous units wherein n is an even integer from 4 to 14 inclusive.

The silanes employed to prepare preferred embodiments of (B) wherein c of the foregoing formulae is O exhibit the formulae $F(C_nF_{2n})CH_2CH_2Si(CH_3)_dY_{3-d}$ or $Y_{3-d}(CH_3)_dSiCH_2CH_2(C_nF_{2n})CH_2CH_2Si(CH_3)_dY_{3-d}$ where d is 0, 1 or 2 and n is as defined hereinbefore. These silanes can be prepared by hydrosilation of a fluorinated olefin of the formula $F(C_nF_{2n})CH=CH_2$ or $CH_2=CH(C_nF_{2n})CH=CH_2$ with a silane of the formula $(CH_3)_dY_{3-d}SiH$. The fluorinated olefin can be a single compound or a mixture of homologs wherein n is an even integer having a value of from 4 to 14, inclusive. The hydrosilation reaction is typically carried out at temperatures of from 150° to 300° C. using as the catalyst an organic peroxide or a platinum-containing material such as chloroplatinic acid. The hydrosilation of fluorinated olefins is disclosed, for example, in U.S. Pat. No. 3,620,992, which issued to Kim and Pierce on Nov. 16, 1971, and is incorporated herein in its entirety by reference.

The preferred foam stabilizers wherein c is 1 and a method for preparing these stabilizers are claimed in an application for Letters Patent entitled "Polyorganosiloxane Compositions" that is being filed concurrently herewith in the name of Joseph Woodward Keil.

Preferred foam stabilizers of the foregoing formula where c is 0 are claimed in an application for Letters Patent entitled "Novel Fluorinated Organosiloxane Copolymers" that is being filed concurrently herewith in the names of Chi-Long Lee, Thomas Fay-Oy Lin and Anthony Pope Wright. A method for preparing these stabilizers is claimed in an application for Letters Patent entitled "Method for Preparing Novel Fluorinated Organosiloxane Copolymers" that is being filed concurrently herewith in the names of Thomas Fay-Oy Lim and Antony Pope Wright.

The foam stabilizer (B) typically constitutes from 0.2 to about 25% by weight of the present foamable compositions, excluding the weight of the volatile blowing agent (C). This value is preferably from 1 to 10% by weight. The minimum concentration of (B) that will adequately maintain the structure of the initially produced liquid froth during curing is a function of several variables, including viscosity of the foamable composition, the rate at which the composition cures and the fluorine content of (B). Higher levels of fluorine are desirable, because the fluorine content of (B) increases, it becomes less compatible with the other ingredients of the present foamable compositions, and is more likely to migrate to the surface of the bubbles that constitute the froth formed when the composition is dispensed from the pressurized container in which it is stored. An alternative method for decreasing the compatibility of (B) with the composition is to incorporate units of the foregoing formula $GSiO_{3/2}$ into (B).

The foamable compositions of this invention can optionally contain up to 50% by weight, based on the total weight of the composition, of finely divided fillers conventionally employed in RTV polyorganosiloxane compositions.

Fume silicas are preferably used at concentrations of from 10 to 20%, based on the weight of the foamable composition.

Finely divided silica fillers are typically treated with relatively low molecular weight, liquid hydroxyl containing organic or organosilicon compounds to prevent a phenomenon referred to in the art as "crepe-hardening" of polyorganosloxane compositions. The filler particles can be treated before being added to the composition or the particles can be treated "in situ" by having a suitable treating material present as an ingredient in the compositions. Known filler treating agents include hydroxyl-containing silicas and polydiorganosiloxanes where the hydrocarbon groups present on silicon are lower alkyl such as methyl, and can also include phenyl, vinyl and 3,3,3-trifluoropropyl.

Other useful fillers include chopped and flocked glass fibers and flame blown glass microfibers. The glass fibers are preferably less than about 8 mm long and less than about $5 \times 10^{-3}$ mm in diameter. Larger diameter fibers can be used, but are not as effective in modifying the flow properties of the foamable composition as the preferred fibers. The larger fibers may also interfere with dispensing of the composition through conventional aerosol valves by clogging passages within the valve.

If a black or grey foam is acceptable, up to about 30% by weight, based on the foamable composition, of carbon black can be added in place of or in combination with glass or other types of fibers.

Compositions containing silica in combination with glass fibers and/or carbon black will be nonslumping when used in combination with liquified blowing agents such as isobutane or chlorinated fluorocarbons such as trifluorochloromethane. A nonslumping composition will not flow appreciably when dispensed onto a vertical or a sloping surface. This characteristic is very desirable if the present compositions will be used to fill joints or other open spaces in a vertical member such as a wall, or in the lower surface of a horizontally oriented member such as the ceiling of a building or other structure.

The foamable compositions of this invention are converted to foams by the action of the blowing agent, referred to hereinbefore as (C). The blowing agent is packaged together with the other ingredients of the compositions in a pressurizable container such as an aerosol can. When the resultant mixture is released from the container it forms a froth that cures over a period of from several minutes to several hours to a solid, elastomeric foam in the presence of atmospheric moisture.

Ingredient (C) can be any material that is a gas at 25° C. under atmospheric pressure. Some blowing agents, such as isobutane, can be liquified under the pressure used to store the present compositions, and when liquified are both miscible and unreactive with said compositions. Other blowing agents, such as nitrogen and compressed air, are gases at the pressures under which the compositions are stored. Suitable liquifiable blowing agents include aliphatic hydrocarbons containing three or four carbon atoms, dimethyl ether, fluorocarbons and chlorofluorocarbons. Nitrogen, compressed air, carbon dioxide and isobutane are particularly preferred on the basis of their cost and availability. Chlorofluorocarbons such as trifluorochloromethane will function as liquifiable blowing agents but are considered undesirable for ecological reasons in some countries.

Ingredient (C) can constitute from about 5 to about 85% of the total weight of the present foamable compositions. The optimum concentration range is dependent upon a number of variables, the most influential of which appears to be the viscosity of the foamable composition, which is, in turn, to a large extent dependent upon the viscosity of (A) and the type and amount of silica and other filler(s) present.

The optimum concentration of (C) is one that will provide the best balance between stability of the froth during curing, a sufficiently rapid discharge rate of the composition from the container in which it is stored and a relatively low density cured foam.

It is believed that too high a concentration of (C) may destroy the cellular structure of the initial froth, while too low a concentration may increase foam density to unacceptably high levels.

If the composition is very viscous and/or contains a filler that impedes flow of the composition through the valve of the pressurized container, it may be desirable to package the entire composition, including blowing agent in one compartment of a 2-compartment can wherein only this compartment is equipped with a valve for dispensing the composition. The second compartment is separated from the first by means of a piston or the wall of a flexible container and contains a propellant that can be of the same composition as the blowing agent or can be a more volatile material. The propellant provides the additional pressure required to dispense the foamable composition from the pressurized container at a faster rate than can be achieved using only the blowing agent. Two compartment aerosol cans are known in the art.

All other conditions being equal, the maximum rate at which a foamable composition of this invention can be dispensed from a pressurized container and the rate at which liquid materials will drain during curing of the foam are both inversely proportional to the viscosity of the foamable composition as determined using a rotating spindle type viscometer. A preferred viscometer is referred to as a Brookfield viscometer. To obtain useful foams the viscosity of the composition should be from 0.5 to 500 Pa.s at 25° C., measured in the absence of the blowing agent (C). The optimum combination of a relatively rapid dispensing rate and stability of the resultant cellular structure during curing is achieved without an excessive amount of blowing agent when the viscosity of the foamable composition in the absence of blowing agent is from 1 to 100 Pa.s at 25° C.

The foamable compositions of this invention can be prepared by packaging the foregoing ingredients, (A), (B) and (C), together with any of the optional additives discussed hereinbefore, under substantially anhydrous conditions in a moisture-tight container, such as an aerosol can, that is capable of withstanding the pressure exerted by the blowing agent and any propellent employed.

The pressurized containers used to package the foamable compositions are equipped with valves wherein the passages through which the composition flows are of sufficient diameter to permit discharge of the composition at a sufficiently rapid rate to form a useful foam. If the composition will be dispensed in portions over a period of several days or weeks, those passages within the valve and spray head that are exposed to atmospheric moisture should be capable of being sealed to minimize contact with atmospheric moisture and resultant curing of foamable composition remaining in these passages. It is also desirable that the passages be of a sufficient diameter to facilitate removal of cured material by mechanical means such as a wire or probe.

Preferably the valves are of the toggle type recommended for dispensing relatively viscous, foamable materials such as whipped cream. Most preferably the discharge tube and valve body are combined in a single elastomeric member that is force fitted into the opening of the container. One or more openings in the valve body are normally closed off by contact with the seat. Displacement of the discharge tube by finger pressure moves the opening(s) in the valve body away from the seat, thereby allowing the contents of the pressurized container to flow into the valve body and through the discharge tube.

Aerosol valves wherein the valve body and spray head are separate units and the valve is equipped with a spring loaded piston are suitable for use with unfilled foamable compositions and those containing finely divided fillers such as silica.

In accordance with one such preparative method, the polymer portion of (A), the foam stabilizer (B) and any optional additives such as pigments, adhesion promoters and flame-retarding agents are blended to homogeneity before being combined and blended with the crosslinker portion of (A) and curing catalyst. This operation is preferably conducted under conditions that avoid contact between these ingredients and atmospheric moisture. The resultant composition is then transferred into a pressurizable container, such as an aerosol can, that is equipped with a dispensing valve. The desired amount of blowing agent (C) is then inserted into the container by appropriate means, usually through the dispensing valve, and the container is shaken to uniformly dispense the blowing agent throughout the composition. Alternatively, the blowing agent can be introduced between the container and valve assembly before the latter is crimped into place. Methods and apparatus for packaging moisture-sensitive materials together with propellants such as isobutane and nitrogen into pressurized containers are well known in the art and do not form part of this invention.

For large scale foam preparations where storage of a foamable composition is not required, a mixture of (A) and (B) together with any other nonvolatile ingredients is dispensed from one container and the gaseous or liquified blowing agent (C) is dispensed from a pressurized storage container. The ingredients are combined in a suitable mixing head and the resultant foam is dispensed at the desired location.

As disclosed hereinbefore, preferred foamable compositions of this invention are stable for periods of up to six months or more when stored in pressure-tight containers that exclude atmospheric moisture. When dispensed from these containers the compositions are converted to a liquid froth by action of the blowing agent (C). Over a period of several minutes, a self supporting foam is formed by the reaction of the polymer and crosslinker portions of (A) in the presence of atmospheric moisture. During this interval the foam stabilizer (B) minimizes collapse of the cellular structure and drainage of liquid materials.

Cured foams prepared using the compositions of this invention are typically of the closed cell type. Those which do not contain silica or other filler typically exhibit densities of from 0.20 to about 0.55 $g/cm^3$. The size of the cells in the foam will typically be less than 4 mm in diameter. Preferably the size range is from 0.2 to 2 mm, and the cell concentration is typically greater than 4 per linear cm.

The present foams can be used in many applications where it is desirable to utilize the unique properties of RTV polyorganosiloxane elastomers in a low density material. The lower density of the foams relative to corresponding noncellular elastomers makes it possible to cover a larger area with the same weight of material. An additional advantage is the insulating properties provided by the closed cell structure of the foam.

The ability of compositions containing the preferred foam stabilizers to remain stable in a pressurized container makes it possible to combine in a single, portable package such as an aerosol container, all of the ingredients required to form a foam. The package can then be transported to the location where the foam is to be applied rather than having to transport the individual ingredients to the location, combine them in the required amounts, and prepare homogeneous composition just prior to forming the foam. This is particularly advantageous in those instances when relatively small amounts of foam are dispensed over a relatively long period of time.

The following examples disclose preferred embodiments of the present foamable compositions and should not be interpreted as limiting the scope of the accompanying claims. All parts and percentages are by weight unless otherwise specified.

EXAMPLE 1

Foamable compositions exhibiting viscosities between 0.5 and 500 Pa.s at 25° C. were prepared using (1), a mixture containing a first hydroxyl endblocked polydimethylsiloxane exhibiting a viscosity of 2 Pa.s and a second hydroxyl endblocked polydimethylsiloxane exhibiting a viscosity of 0.08 Pa.s in a weight ratio of 2:1, respectively, both polydimethylsiloxanes being curable by the moisture reactive crosslinking agent (2) methyltrimethoxysilane, (3) diisopropoxydiethylacetoacetato titanium as a crosslinking catalyst, (4)

isobutane as the blowing agent, (5) a 50% by weight solution in a trimethylsiloxy endblocked polydimethylsiloxane of a foam stabilizer obtained by reacting a mixture of homologous fluorinated alcohols of the general formula F(CF$_2$)$_n$CH$_2$CH$_2$OH, available as Zonyl ® BA fluoroalcohol from E. I. DuPont de Nemours and Co., Wilmington, De., with an organosiloxane copolymer of the type described by Daudt and Tyler in U.S. Pat. No. 2,676,182 containing (CH$_3$)$_3$SiO$_{\frac{1}{2}}$ units and SiO$_{4/2}$ units in a molar ratio of about 0.7:1, respectively, and about 3% by weight of silicon-bonded hydroxyl groups, and (6) a hydroxyl-containing liquid dimethylsiloxane graft copolymer available as Silgan ® H-622 from SWS Silicones, Adrian, Michigan. The average value of n in the foregoing formula for the fluoroalcohol is 8.

The foam stabilizer was prepared by combining 319 parts of the aforementioned organosiloxane copolymer as a 71 weight % solution in isomeric xylenes, 169 parts of isomeric xylenes and 3 parts by weight of an alcoholic solution of potassium hydroxide. The resultant mixture was heated for about 5 minutes at the boiling point in a reaction vessel equipped with a reflux condenser and Dean Stark apparatus, at which time 25 parts by weight of molten Zonyl BA fluoroalcohol were added gradually to the reaction mixture and the mixture was heated at the boiling point for two hours. The resultant solution was allowed to cool to 60° C., at which time solid carbon dioxide was slowly added to neutralize the reaction mixture. After remaining undisturbed for about 16 hours, 235 parts by weight of a trimethylsiloxy endblocked polydimethylsiloxane exhibiting a viscosity of 0.01 Pa.s were added, following which the xylenes and other volatile materials were removed by distillation under reduced pressure. The final solution contained 50% by weight of the reaction product in the polydimethylsiloxane.

The foam stabilizer included repeating units of the formulae (CH$_3$)$_3$SiO$_{\frac{1}{2}}$, SiO$_{4/2}$ and fluorine-containing units of the average formula F(CF$_2$)$_8$CH$_2$CH$_2$OSiO$_{3/2}$. The surface tension exhibited by a 10% by weight solution of the foam stabilizer in a hydroxyl-endblocked polydimethylsiloxane having a viscosity of 0.08 Pa.s at 25° C. was less than 2.2×10$^{-4}$ newtons per cm. when measured at 25° C.

The concentrations of each of the ingredients (1)–(6) in each of the seven compositions evaluated are listed in the following Table 1. One of the compositions evaluated (G) did not contain ingredient (6) in order to determine the effect of this ingredient on the curing time of the composition.

A homogeneous mixture of ingredients (1) and (6) was placed in a Sem Kit ® tube (commercially available from Semco, Inc., Division of Products Research and Chemical Corp., Glendale, CA). This device is a cylinder formed from polyethylene, resembles a tube commonly used to package caulking compounds and incorporates (1) a means for adding materials and stirring the contents of the tube with the exclusion of atmospheric moisture.

The mixture of ingredients (1) and (6) was desired, following which (2) and (5) were added and a cover placed on the rear of the tube. Ingredient (3) was then introduced using a hypodermic syringe and the resultant formulation was mixed for 3 minutes, at which time the mixture was transferred into a conventional one-compartment aerosol can without coming into contact with atmospheric moisture. The formulation exhibited a viscosity within the range from 0.5 to 500 Pa.s at 25° C.

The valve assembly was then placed on the can and the contents of the can were placed under a negative gauge pressure of about 2.7 kPa for about 2 seconds before the valve assembly was attached to the can by crimping. Liquified isobutane (4) was then introduced through the valve and the can was shaken by hand for 1 minute to distribute the blowing agent homogeneously throughout the composition. The valve assembly used consisted of a type R-70-118 valve and a type 182-125 sprayhead, both manufactured by Newman Green, Inc. The sprayhead is of the type recommended for use with aerosol-type fire extinguishers.

Foams were prepared by discharging a portion of the contents of the can into a small glass cosmetic jar to a depth of about 1.3 cm. When the foam had cured, a sample of known volume was removed and weighed to determine density. The average cell size was determined optically using a rule with a millimeter scale. The densities and average cell size range for each of the formulations evaluated together with the time, in minutes, required for the foam to develop (1) a film on the surface, referred to as skin-over time or SOT, (2) a tack-free surface, referred to as tack-free time or TFT. The amount of cured foam relative to noncellular cured rubber present in the sample jar is referred to as "% foam."

TABLE 1

| Sample | Ingredient (Parts by Weight) | | | | | |
|---|---|---|---|---|---|---|
| | 1 | 2 | 3 | 4 | 5* | 6 |
| A | 71.7 | 3.7 | 3.5 | 18 | 2.0 | 10.0 |
| B | 64.2 | 3.5 | 3.5 | 18 | 2.0 | 17.0 |
| C | 46.7 | 3.0 | 3.5 | 18 | 2.0 | 35.0 |
| D | 26.7 | 2.4 | 3.5 | 18 | 2.0 | 55.0 |
| E | 16.7 | 1.8 | 3.5 | 18 | 2.0 | 65.0 |
| F | 25.0** | 9.1 | 2.75 | 9 | 1.4 | 25.2 |
| G | 81.7 | 4.0 | 3.5 | 18 | 2.2 | 0 |

*The stated amount of stabilizer was added as a 50% by weight solution in a trimethylsiloxy endblocked polydimethylsiloxane exhibiting a viscosity of 0.01 Pa.s
**Ingredient 1 was a hydroxyl endblocked polydimethylsiloxane exhibiting a viscosity of 0.08 Pa.s

TABLE 2

| Sample | Weight % of Ingredient 6* | SOT (Min.) | TFT (Min.) | % Foam | Density (g./cc.) | Cell Size (mm.) |
|---|---|---|---|---|---|---|
| A | 12 | 3 | 5 | 100 | 0.22 | 0.2–2.0 |
| B | 21 | 4 | 10 | 100 | n.d. | n.d. |
| C | 43 | 5 | 7 | 85 | 0.38 | 0.5–4 |
| D | 67 | 4 | 10 | 100 | 0.24 | 0.5–4 |
| E | 80 | 3 | 7 | 60 | 0.55 | 0.5–2 |
| F | 50 | 15 | 30 | 75 | n.d. | 0.3–1.5 |
| G | 0 | 10 | 100 | 80 | 0.43 | 0.5 |

*Based on total weight of composition
n.d. = not determined

All of the cells in the seven foams were less than 4 mm in diameter and the cell concentration was at least 4 per linear centimeter.

EXAMPLE 2

This Example demonstrates the preparation of foams using crosslinkers containing acetoxy, methoxy or N,N-dimethylaminoxy as the hydrolyzable group.

Foamable compositions having viscosities within the range from 0.5 to 500 Pa.s at 25° C. in the absence of blowing agent were prepared and packaged in aerosol spray cans using the procedure described in Example 1 hereinabove. The compositions contained the two dimethylsiloxane homopolymers of Example 1 (viscosities of 2 and 0.08 Pa.s at 25° C., referred to hereinafter as polymers I and II, respectively), 2.0 or 2.2 parts of the foam stabilizer of Example 1, 9.0 or 12 parts of isobutane and a moisture reactive crosslinker composition identified as A, B or C. Composition (A) contained 9.0 parts vinyltriacetoxy silane as the crosslinker and 0.5 parts of dibutyltin dilaurate as a curing catalyst; composition (B) contained 5.2 parts of methyltrimethoxysilane as the crosslinker and 1.7 parts of diisopropoxydiethylacetoacetato titanium as the curing catalyst, and composition (C) contained 11.1 parts of a siloxane of the general formula

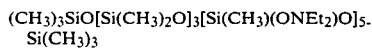
$(CH_3)_3SiO[Si(CH_3)_2O]_3[Si(CH_3)(ONEt_2)O]_5\text{-}Si(CH_3)_3$ where Et represents ethyl. The amounts (in parts) of the two aforementioned polymers, foam stabilizer and isobutane present in each of the compositions are summarized in the following Table 3. The density and cell size range of the cured foams and the percent by volume of cellular material present in the cured products are summarized in Table 4.

TABLE 3

| Crosslinker Composition | Polymer I | Polymer II | Stabilizer | Isobutane |
|---|---|---|---|---|
| A | 25.0 | 12.5 | 2.0 | 9.0 |
| B | 27.2 | 13.6 | 2.2 | 12.0 |
| C | 30.0 | 7.5 | 2.0 | 9.0 |

TABLE 4

| Crosslinker Composition | Density 5/cc | Cell Size Range mm. | % Foam |
|---|---|---|---|
| A | 0.32 | 1 | 70% |
| B | 0.38 | 0.2–1.5 | 65% |
| C | 0.35 | 0.2–2.5 | 75% |

The three crosslinker compositions yielded useful foams wherein the density and cell size were within the limits set forth hereinbefore for foams prepared using the compositions of this invention.

The foam stabilizer present in the composition of the foregoing Examples 1 and 2 was prepared by reacting a fluorinated alcohol with a benzene-soluble organosiloxane copolymer containing $(CH_3)_3SiO_{\frac{1}{2}}$ and $SiO_{4/2}$ units in addition to silicon-bonded hydroxyl groups. As disclosed hereinbefore, in this type of foam stabilizer the fluorine-containing portion is bonded to silicon by means of an oxygen atom. Foamable compositions containing this type of foam stabilizer may not exhibit good storage stability in acidic media or in the presence of organotin compounds and should therefore be used within a day or two after being prepared. If the foamable compositions will be kept in a container for more than 1 or 2 days under these conditions before being dispensed to form a foam, it is preferable to use foam stabilizers of the type disclosed in the following Example 3.

EXAMPLE 3

This Example demonstrates the preparation of polyorganosiloxane foams using compositions of this invention that contain four different foam stabilizers, each of which have a fluorinated hydrocarbon radical bonded to silicon by a carbon atom.

The foam stabilizers were prepared by reacting the organosiloxane copolymer described in the preceding Example 1, as a 75% solution in isomeric xylenes, with one of three mixtures of homologous fluorosilanes of the general formula $F(CF_2)_nCH_2CH_2Si(CH_3)_mCl_{3-m}$. In each of the stabilizers n represents combinations of 6, 8, 10 and 12. The value of m was 0, 1 or 2, depending upon the particular stabilizer.

The organosiloxane copolymer exhibited a molecular weight of 4200, as determined by gel permeation chromatography, and contained 3.1% by weight of hydroxyl groups.

The mixtures of homologous fluorosilanes were prepared by reacting a mixture of homologous fluoroolefins of the general formula $F(CF_2)_nCH=CH_2$ with one of three silanes of the general formula $H(CH_3)_mSiCl_{(3-m)}$, where m was 0, 1 or 2.

The preparation of each of the four stabilizers is described in detail hereinbelow:

Stabilizer A—Reaction product of $F(CF_2)_nCH_2CH_2Si(CH_3)_2Cl$ (I) with the organosiloxane copolymer in a 1:1 molar ratio.

A sample of $F(CF_2)_nCH=CH_2$ received from E. I. DuPont de Nemours and Co. was distilled under reduced pressure to yield a mixture of homologs. In the various molecules, n of the foregoing formula had the value 6, 8, 10 or 12. The average molecular weight of the distillate, determined from a vapor phase chromatogram, was 422 g/mol. A 42.2 g. portion of the distillate was reacted in a sealed glass tube with 12.3 g. of dimethylchlorosilane and 4 drops of an isopropanol solution of chloroplatinic acid (equivalent to $1\times10^{-4}$ mole of platinum per mole of fluorinated olefin). The tube was heated at a temperature of 110° C. for 20 hours to yield a fluorinated silane. A second sample of the same fluorinated silane was prepared in a similar manner using 87.7 g. of the fluoroolefin, 28.3 g. of dimethylchlorosilane and 20 drops of the chloroplatinic acid solution. In this instance the reaction mixture was heated for 2 days at 110° C. The two samples of silane were combined and distilled under reduced pressure. The distillate boiling from 92° C. at a pressure of 2.9 kPa to 122° C. at a pressure of 0.26 kPa was collected and analyzed by vapor phase chromatography. It was found to contain about 19% by weight of unreacted olefins. The average molecular weight of the silane portion was calculated as 522.8 g. per mol. A 22.0 g. portion of the distillate, equivalent to 34.1 mmol, was combined with 200 g. (35.7 mmol) of the 75 weight percent organosiloxane copolymer solution described in Example 1, 0.21 g. of trifluoromethanesulfonic acid and 200 g. of toluene. The resultant mixture was heated for 1 hour at 60° C., at which time a 100 g. portion was removed and neutralized using 0.13 g. of sodium bicarbonate. A 40 g. portion of a trimethylsiloxy endblocked polydimethylsiloxane exhibiting a viscosity of 0.02 Pa.s at 25° C. was then added and volatile materials were removed by heating the reaction mixture under the reduced pressure produced by a mechanical vacuum pump until the temperature of the mixture reached 100° C. The residue, which consisted essentially of a 50 weight percent solution of the fluorinated organosiloxane copolymer in the trimethylsiloxy endblocked polydimethylsiloxane was employed as stabilizer.

Stabilizer B—Reaction product of $F(CF_2)_nCH_2CH_2Si(CH_3)Cl_2$ with the organosiloxane polymer in a 1:1 molar ratio.

A mixture of $F(CF_2)_nCH=CH_2$ homologs was distilled as described in the foregoing procedure for Stabilizer A. The distilled olefin was then combined with 8% by weight of zinc dust and heated at about 80° C. for one hour, at which time the liquid portion was distilled under reduced pressure. The fraction boiling from 54° C. at 8.4 kPa to 120° C. at 4.7 kPa was collected and analyzed by vapor phase chromatography. The fraction was found to contain 34% by weight of $F(CF_2)_6CH=CH_2$, 37% by weight of $F(CF_2)_8CH=CH_2$, 22% of $F(CF_2)_{10}CH=CH_2$ and 4% by weight of $F(CF_2)_{12}CH=CH_2$. The calculated average molecular weight of the fraction was 442.

Three 64.5 g. portions of this fraction were each reacted in a sealed tube with 23 g. of methyldichlorosilane in the presence of 200 μl of the chloroplatinic acid solution described for Stabilizer A. The sealed tubes were heated for 5 hours at 115° C. The resultant products were combined and distilled under reduced pressure. The fraction boiling from 71° C. at a pressure of 2.9 kPa to 150° C. at a pressure of 0.133 kPa was collected and analyzed by vapor phase chromatography. The fraction amounted to an 86% yield, based on reactants, and exhibited an average molecular weight of 544 g./mol. The fraction was found to contain 38% of the $F(CF_2)_nCH_2CH_2Si(CH_3)Cl_2$ homolog where n=6, 35% of the n=8 homolog, 19% of the n=10 homolog and 4% of the n=12 homolog. A 20.4 g. portion of this fraction, equivalent to 35.8 mmol, based on the calculated molecular weight, was reacted with 200 g. (35.7 mmol) of the organosiloxane copolymer solution in the presence of 100 g. of toluene and 0.1 g. trifluoromethanesulfonic acid as described in the foregoing procedure for preparing Stabilizer A. A 3.0 g. portion of sodium bicarbonate and 50 g. of the polydimethylsiloxane exhibiting a viscosity of 0.02 Pa.s were used to obtain the final Stabilizer B as a 50% by weight solution.

Stabilizer C—Reaction product of $F(CF_2)_nCH_2CH_2Si(Me)Cl_2$ with the organosiloxane copolymer in a 3:1 molar ratio.

Stabilizer C was prepared as a 50% by weight solution in the hydroxyl endblocked polydimethylsiloxane using the same procedure and reactants described hereinbefore in connection with Stabilizer B. The only difference was that 61.2 g (107 mmol) of the mixture of homologous fluorinated silanes of the general formula $F(CF_2)_nCH_2CH_2Si(Me)Cl_2$, where n is defined hereinabove in the example, were reacted with 200 g. of the organosiloxane copolymer solution.

Stabilizer D—Reaction product of $F(CF_2)_nCH_2CH_2SiCl_3$ with the organosiloxane copolymer in a 1:1 molar ratio.

Two samples of the fluorinated silane $F(CF_2)_nCH_2CH_2SiCl_3$ were obtained as described for the preceding stabilizers by reacting 64.5 g. (0.15 mmol) of the fluoroolefin mixture used for Stabilizer B with 24.4 g. (0.18 mmol) of trichlorosilane and 200 μl of the chloroplatinic acid solution. The sealed tubes were heated for 16 hours at 115° C. The two yields of products were combined and distilled under reduced pressure. The fraction boiling from 71° C. at 2.9 kPa to 135° C. at 0.13 kPa was collected and analyzed by vapor phase chromatography. The distillate represented an 83% yield, based on starting reactants, and exhibited an average molecular weight of 573 g./mol. A 20.4 g. (35.6 mmol) sample of the distillate was reacted with 200 g. (35.7 mmol) of the organosiloxane copolymer solution used to prepare the stabilizers A, B and C, 100 g. of toluene and 0.1 g. of trifluoromethanesulfonic acid. The procedures for conducting the reaction and isolating the product to obtain a 50% by weight solution of the stabilizer are described hereinbefore for Stabilizer B.

Stabilizers A, B, C and D each contain repeating units of the formulae $(CH_3)_3SiO_{\frac{1}{2}}$, $SiO_{4/2}$ and fluorine-containing units of the formula $R_aR'_bSiO_{(4-a-b)/2}$ where R is $F(CF_2)_nCH_2CH_2$—where R' is methyl a is 1, b is 2 for stabilizer A, 1 for stabilizer B and 0 for stabilizers C and D, and the average value of n is 8 for all stabilizers.

Stabilizers A, B, C and D all reduce to less than $2.2\times10^{-4}$ newtons per cm. the surface tension exhibited by a hydroxyl endblocked polydimethylsiloxane exhibiting a viscosity of 0.08 Pa.s at 25° C. when the concentration of the stabilizer in the polydimethylsiloxane is 10% by weight. All of the 10% solutions were clear without the addition of xylene.

Using the procedure described in Example 1, each of the foregoing foam stabilizers A-D were individually incorporated into a flowable, foamable composition containing the following ingredients:

100 parts of a hydroxyl endblocked polydimethylsiloxane exhibiting a viscosity of 15 Pa.s, 5 parts of $CH_3Si[ON=C(CH_3)C_2H_5]_3$, 5 parts of foam stabilizer A, B, C or D described hereinabove, 0.2 parts of dibutyltin dilaurate and 15 parts of isobutane as the blowing agent.

The ingredients were mixed and packaged in a one compartment aerosol container equipped with a toggle action valve (type R6F manufactured by Rockwell Corporation). Foams were produced by dispensing each of the compositions as described in Example 1. The extent to which the foams collapsed during curing, the density and cell size range in the cured foam and the % by volume of noncellular rubber layer present in the cured foam are listed in Table 5. The viscosity of each composition prior to the addition of blowing agent was within the range from 0.5 to 500 Pa.s at 25° C.

TABLE 5

| Stabilizer | Density (g/cc) | % Collapse | Cell Size (mm) | Volume % of Foam |
| --- | --- | --- | --- | --- |
| A | 0.40 | 53 | 0.2–2.8 | 80 |
| B | 0.36 | 67 | 0.2–1.2 | 80 |
| C | 0.38 | 60 | <0.1–0.8 | 87 |
| D | 0.32 | 67 | 0.2–2.8 | 85 |

The percent collapse exhibited during curing was calculated using the formula [(initial foam height−final foam height)/initial foam height]×100. The concentration of cells in all of the foregoing cured foams was greater than four per linear centimeter.

EXAMPLE 4

This Example demonstrates the utility of a preferred foam stabilizer in foamable compositions containing three different types of moisture reactive crosslinkers, namely (1) a 1:1 weight ratio mixture of methyl triacetoxysilane and ethyltriacetoxysilane, (2) methyltrimethoxysilane and (3) a siloxane of the general formula $(CH_3)_3SiO[Si(CH_3)_2O]_3[Si(CH_3)(ONEt_2)O]_5Si(CH_3)_3$ where Et represents —$C_2H_5$. Crosslinker (1) was used at a level of 5 parts per 100 parts of hydroxyl endblocked polydimethylsiloxane and was used in combination with 10%, based on the weight of (1), of dibutyltin dilaurate; crosslinker (2) was used at a level of 5.2 parts per 100 parts of hydroxyl endblocked polydimethylsiloxane and was used in combination with 31%, based on the weight of (2), of diisopropoxydiethylacetoacetato titanium. Crosslinker (3) was used at a level of 9 parts per 100 parts of hydroxyl endblocked polydimethylsiloxane and did not require a curing catalyst.

In addition to the aforementioned crosslinkers and catalysts, each of the foamable compositions also contained 100 parts of a hydroxyl endblocked polydimethylsiloxane exhibiting a viscosity of 15 Pa.s at 25° C., 5 parts of a foam stabilizer and 9 parts of isabutane. The viscosity of each composition in the absence of blowing agent was from 0.5 to 500 Pa.s at 25° C.

The foam stabilizer was prepared as described in the preceding Example 3 for Stabilizer C, and the foamable compositions were prepared and packaged in aerosol cans as described in the preceding Example 1. A mixture of the hydroxyl endblocked polydimethylsiloxane and foam stabilizer was deaired in a Sem Kit ® tube, at which time the crosslinker and any catalyst were added. The procedures for introducing the blowing agent and dispensing and evaluating the foam are described in Example 1. The aerosol valve was of the toggle type described in the foregoing Example 3.

The density, average cell size and cell size range of the cured foams are summarized in the following table.

| Crosslinker | Density (g/cc) | Avg. Cell Size (mm) | Cell Size Range (mm) |
|---|---|---|---|
| 1 | 0.35 | 0.3 | 0.1–1.2 |
| 2 | 0.29 | 0.3 | 0.1–1.1 |
| 3 | 0.53 | 0.4 | 0.1–1.0 |

After being stored in the aerosol can for five weeks, all of the three compositions yielded from 95 to 100% foam.

All of the foams exhibited cell concentrations of at least four per linear centimeter.

EXAMPLE 5

This example demonstrates the relatively large cell size and low cell concentration obtained when one of the present foam stabilizers is replaced by either an organosiloxane copolymer or a fluorinated alcohol. Both materials can be used as intermediates to prepare the present stabilizers, and are disclosed in the prior art as useful for reducing the density of polyorganosiloxane foams obtained by reacting an organosilicon material containing silicon-bonded hydroxyl groups with a material containing silicon-bonded hydrogen atoms.

Foamable compositions were prepared and packaged in aerosol cans equipped with toggle type valves using the procedures described in the preceding Example 1 with the following ingredients:

90 parts of a hydroxyl-terminated polydimethylsiloxane exhibiting a viscosity of 15.2 Pa.s at 25° C.
10 parts of Silgan ® H622 (described in Example 1)
0 or 5 parts of a stabilizer candidate
5 parts of $CH_3Si[ON=C(CH_3)(C_2H_5)]_3$
0.2 part of dibutyltin dilaurate
12 parts of liquified isobutane.

Each of the foregoing compositions had a viscosity within the range of from 0.5 to 500 Pa.s at 25° C. prior to addition of the blowing agent.

The three foam stabilizer candidates evaluated were (1) the nonfluorinated organosiloxane copolymer used to prepare the stabilizer used in the formulations of Example 1, (2) the fluoroalcohol (Zonyl ® BA) used to prepare the stabilizer of Example 1, and (3) a stabilizer of this invention.

Stabilizer (3) was prepared by reacting a fluorinated olefin of the average formula $F(CF_2)_8CH=CH_2$ with about a 15% stoichiometric excess of $MeHSiCl_2$ in a sealed tube for 69 hours at a temperature of 150° C. using a solution of chloroplatinic acid in isopropanol as the catalyst. The amount of catalyst was equivalent to $3.3\times10^{-4}$ gram of platinum per gram of olefin. After being distilled from the reaction mixture, 146 g. (0.27 mole) of the resultant silane was reacted with 504 g. (0.09 mole) of the organosiloxane copolymer of Example 1 in a molar ratio of 3:1 using 250 g. of toluene as the reaction medium and 0.25 g. trifluoromethanesulfonic acid as the catalyst. The molecular weight of the copolymer was 4200. The reaction mixture was heated at a temperature of from 60° to 70° C. for 1 hour, at which time the reaction mixture was neutralized with sodium bicarbonate and combined with about 500 g. of a liquid trimethylsiloxy terminated polydimethylsiloxane exhibiting a viscosity of 0.02 Pa.s at 25° C. Following removal of solid material by filtration the volatile materials, including toluene, were removed under reduced pressure to yield a 50% by weight solution of the stabilizer in the polydimethylsiloxane.

All of the stabilizer candidates were added to the foamable composition as 50% by weight solutions in a trimethylsiloxy-terminated polydimethylsiloxane exhibiting a viscosity of 0.02 Pa.s at 25° C.

A foamable composition without any stabilizer candidate was evaluated as a control. The density, average cell size and cell concentration of the foams obtained from the foam compositions evaluated are recorded in Table 6.

TABLE 6

| Stabilizer Candidate | Foam Density (g./cc) | Average Cell Size (mm) | Cell Concentration (Cells/cm.) |
|---|---|---|---|
| 1 (comparison) | 0.82 | 2 | 0.4 |
| 2 (comparison) | 0.29 | 5 | 2.2 |
| 3 (invention) | 0.34 | 0.2 | 23.6 |
| None (control) | 0.48 | 7 | 1.4 |

The data in Table 3 demonstrate that the cured foam obtained using a stabilizer of this invention exhibited the smallest cell size and the highest cell concentration, by a factor of at least 10, relative to the other foams.

Of the comparative foams, which contained additives disclosed in the art as effective for reducing the density of polyorganosiloxane foams, the one containing the organosiloxane copolymer was of lower quality than the control with respect to average cell size and cell distribution. The cell concentration of the foam prepared using the fluorinated alcohol as the foam stabilizer was only slightly higher than the control (2.2 cells per cm. vs. 1.4 cells per centimeter for the control).

EXAMPLE 6

This example demonstrates that foams exhibiting the density range that characterizes products obtained using the present compositions cannot be prepared using prior art foamable compositions even if one compensates for the density imparted by the fillers required in these prior art compositions.

A foamable composition was prepared using the ingredients disclosed in the example of German OLS No. 2,911,971 discussed hereinbefore. Specifically, 30.9 parts of a hydroxyl endblocked polydimethylsiloxane exhibiting a viscosity of about 50 Pa.s at 25° C., 11 parts of a trimethylsiloxy endblocked polydimethylsiloxane exhibiting a viscosity of 1 Pa.s at 25° C., 50 parts of finely divided calcium carbonate available under the trade name Camel White and 4 parts of fume silica were mixed together and passed once over a three roll rubber processing mill. The resultant mixture was placed in a Sem Kit ® tube, deaired and combined with 4.09 parts $CH_3Si[ON=C(CH_3)(C_2H_5)]_3$ and 0.004 part dibutyltin dilaurate to form a homogeneous composition. The composition was placed in a bag formed from polyethylene film having a thickness of 0.152 mm. The bag was then fitted to a ball type aerosol valve and the assembly was secured onto an aerosol can. 29 parts of an 80/20 weight ratio isobutane/propane mixture was introduced into the space between the wall of the can and the bag. The can was then stored and foams were dispensed after 2 and 3 weeks.

For purposes of comparison with the foams disclosed in the preceding Examples 1–4, which did not contain any filler, the actual density values of the foams obtained from the comparative composition of this example were reduced by 0.29 g./cc to compensate for the weight contributed by the calcium carbonate filler. Even after this compensation, the density of the foams was 0.62 g./cc, which is one and one-half times the highest value reported in the preceeding Example 3.

EXAMPLE 7

This example discloses preparation of a foam from a composition of this invention using nitrogen as the blowing agent.

A foamable composition exhibiting a viscosity within the range from 0.5 to 500 Pa.s at 25° C. in the absence of blowing agent was prepared, packaged, dispensed and cured using the procedures described in the foregoing Example 1 with the types and amounts of polymers, curing agent and curing catalyst disclosed in Example 5. In this instance the stabilizer was 5 parts of Stabilizer C of Example 3 and the blowing agent was nitrogen under a pressure of 897 kPa and the aerosol can was equipped with a toggle type valve. The density of the cured foam was 0.41 g./cc, the average cell size was 0.3 mm and a representative portion of the cured foam contained 20 cells per linear centimeter.

EXAMPLE 8

This example discloses a "nonslumping" foamable composition of this invention that contains a silica filler.

A foamable composition was prepared and packaged in an aerosol can equipped with a toggle type valve following the procedures described in the preceding Example 1 using the following types and amounts of ingredients.
1. 100 parts OH-endblocked polydimethylsiloxane, $\eta = 15$ Pa.s at 25° C.
2. 3.25 parts of a liquid hydroxyl endblocked polymethylphenylsiloxane containing about 4.5 weight percent of silicon-bonded hydroxyl groups
3. 13 parts of fume silica
4. 7 parts of Stabilizer D described in Example 3 hereinbefore
5. 10 parts of $CH_3Si[ON=C(CH_3)(C_2H_5)]_3$
6. 0.2 part dibutyltin dilaurate
7. 1.5 part $H_2NCH_2CH_2N(H)CH_2CH_2CH_2Si(OCH_3)_3$ as an adhesion promoter
8. 15 parts isobutane Ingredients 1–4 and 7 were combined to form a homogeneous mixture, placed in a Sem Kit ® tube and deaired, at which time ingredients 5 and 6 were added, mixed and the resultant foamable composition was transferred into a one-compartment aerosol can. Prior to introduction of the blowing agent, the viscosity of the composition was within the range from 0.5 to 500 Pa.s at 25° C. The isobutane was introduced through the dispensing valve after the can had been assembled.

After being thoroughly shaken to disperse the blowing agent, the composition was dispensed onto a vertical surface and allowed to cure. The composition did not flow during curing. The cured foam exhibited a density of 0.4 g./cc. The average cell size was between 0.2 and 4 mm and the cell concentration in a representative section was greater than four per linear centimeter.

That which is claimed is:

1. A cured polyorganosiloxane foam exhibiting a substantially closed cell structure, a maximum cell size of less than 4 mm and a minimum cell concentration of four per linear centimeter, said foam having been formed by dispensing a foamable polyorganosiloxane composition from a pressure resistant container into an area under atmospheric pressure and allowing the resultant product to cure in the presence of atmospheric moisture, where said foamable polyorganosiloxane composition exhibits a viscosity of from 0.5 to 500 Pa.s at 25° C. in the absence of a blowing agent is stable during storage under substantially anhydrous conditions and superatmospheric pressure, and comprises the product obtained by mixing in the absence of atmospheric moisture
    (A) a room temperature vulcanizable elastomeric composition comprising the moisture curable product obtained by mixing
        (1) an organosiloxane polymer curable in the presence of a moisture reactive crosslinker and selected from the group consisting of polydimethylsiloxanes and graft copolymers containing at least 20 mole percent of dimethylsiloxane units, any remaining units being derived from substantially linear addition or condensation type organic polymers, and
        (2) an amount of a crosslinker sufficient to cure (1) in the presence of atmospheric moisture,
    (B) A foam stabilizer in an amount sufficient to stabilize said foam during the curing process, where (B) consists essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR'_bSiO_{(4-a-b)/2}$, $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, R'' is a divalent organic radical containing at least four perfluorinated carbon atoms and is bonded to the two silicon atoms of said fluorine-containing units by a sequence of at least two methylene units or by an oxygen atom that is, in turn, bonded to a sequence of at least two methylene units, a is 1 or 2, b is 0, 1 or 2 and the sum of a and b is 3 or less, with the proviso that when R and R″ represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (B) in a hydroxyl endblocked polydimethylsiloxane exhibiting a viscosity of 0.08 Pa.s at 25° C. and (b) require the addition of from 0 to 100 percent by weight of xylene to said 10 percent by weight solution to achieve optical clarity;

(C) a blowing agent in an amount sufficient to convert said polyorganosiloxane composition to a foam under atmospheric pressure and at a temperature of 25° C.

2. A foam according to claim 1 where the fluorine-containing units of (B) are of the formula $R_a R'_b SiO_{(4-a-b)/2}$ where R is $F(C_n F_{2n})(CH_2)_2 O_d$; R' is methyl; a is 1, b is 0, 1 or 2; d is 0 or 1 and where in each of said fluorine-containing units n represents an integer that is identical or different with respect to the value of n in other fluorine-containing units of (B), the average value of n being from 4 to 20, inclusive.

3. A foam according to claim 2 where d is 0 and (B) is the reaction product of an organosiloxane copolymer consisting essentially of $(CH_3)_3 SiO_{\frac{1}{2}}$ units, $SiO_{4/2}$ units and from 0.5 to about 4.0% by weight of silicon-bonded hydroxyl groups with a mixture of homologous silanes of the formula $F(CF_2)_n (CH_2)_2 Si(CH_3)_b Cl_{3-b}$, where n varies among said silanes and represents an even integer from 4 to 14, inclusive.

4. A foam according to claim 2 where d is 1 and (B) is the reaction product of an organosiloxane copolymer consisting essentially of $(CH_3)_3 SiO_{\frac{1}{2}}$ units, $SiO_{4/2}$ units and from 0.5 to about 4.0% by weight of silicon-bonded hydroxyl groups with a mixture of homologous fluorine-containing alcohols of the general formula $F(CF_2)_n (CH_2)_2 OH$, where n in each molecule of said alcohols n represents an even integer from 4 to 14, inclusive.

5. A foam according to claim 4 where (B) contains up to 10%, based on the weight of (B), of $GSiO_{3/2}$ units.

6. A foam according to claim 5 where (G) represents the residue of a styrene/allyl alcohol copolymer.

7. A foam according to claim 1 where said foam stabilizer constitutes from 1 to 10% of the weight of said foam.

8. A foam according to claim 1 where the maximum cell size is 2 mm.

* * * * *